(12) United States Patent
Staub et al.

(10) Patent No.: US 6,236,916 B1
(45) Date of Patent: May 22, 2001

(54) AUTOGUIDANCE SYSTEM AND METHOD FOR AN AGRICULTURAL MACHINE

(75) Inventors: Michael D. Staub, Washington; Darin S. Motz, Pekin, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/280,198

(22) Filed: Mar. 29, 1999

(51) Int. Cl.⁷ .................................................. G05B 19/18
(52) U.S. Cl. ................................. 701/29; 701/28; 701/50
(58) Field of Search ................................. 701/28, 29, 50, 701/207, 209; 172/2, 5, 6, 26; 180/131, 169; 348/120

(56) References Cited

U.S. PATENT DOCUMENTS

| | | | |
|---|---|---|---|
| 4,299,483 | 11/1981 | Grove et al. | 356/141.1 |
| 4,482,960 | * 11/1984 | Pryor | 701/28 |
| 4,769,700 | * 9/1988 | Pryor | 348/120 |
| 4,835,691 | 5/1989 | Rotem et al. | 701/23 |
| 5,224,551 | * 7/1993 | Sukup | 172/6 |
| 5,260,875 | 11/1993 | Tofte et al. | 375/327 |
| 5,279,068 | * 1/1994 | Rees et al. | 47/1.7 |
| 5,369,589 | 11/1994 | Steiner | 364/449 |
| 5,987,371 | 11/1999 | Bailey et al. | 701/50 |
| 5,991,694 | 11/1999 | Gudat et al. | 702/2 |
| 6,088,644 | * 7/2000 | Brandt et al. | 701/50 |

FOREIGN PATENT DOCUMENTS

WO98/19514  5/1998  (WO) .

OTHER PUBLICATIONS

"AgGPS 132 Parallel Swathing Option", Trimble Product Catalog dated Mar. 11, 1999.
"Swath Star III", Satloc Precision GPS Applications dated Mar. 11, 1999.

* cited by examiner

Primary Examiner—William A. Cuchlinski, Jr.
Assistant Examiner—Marthe Y. Marc-Coleman
(74) Attorney, Agent, or Firm—Steve D. Lundquist

(57) ABSTRACT

A system and method for providing autoguidance for an agricultural machine. The system includes a main machine control module to control steering of the agricultural machine, a position determining system, and a guidance map. The system also includes an autoguidance control module to receive a position signal from the position determining system and data from the guidance map, and responsively determine a current position and a desired path to traverse by the agricultural machine, wherein the desired path to traverse is determined with respect to rows of crop in a field, and wherein the main machine control module is adapted to receive a control signal from the autoguidance control module and control steering of the agricultural machine in response to activation of the autoguidance control module control signal.

29 Claims, 4 Drawing Sheets

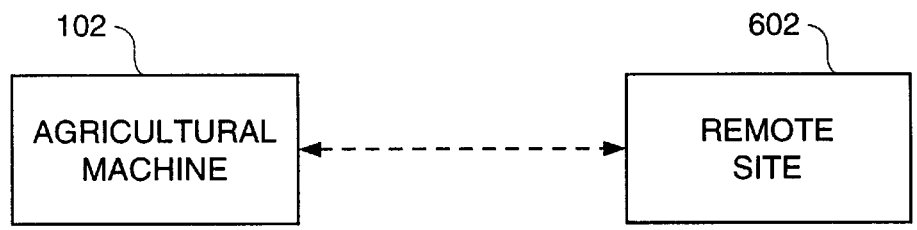
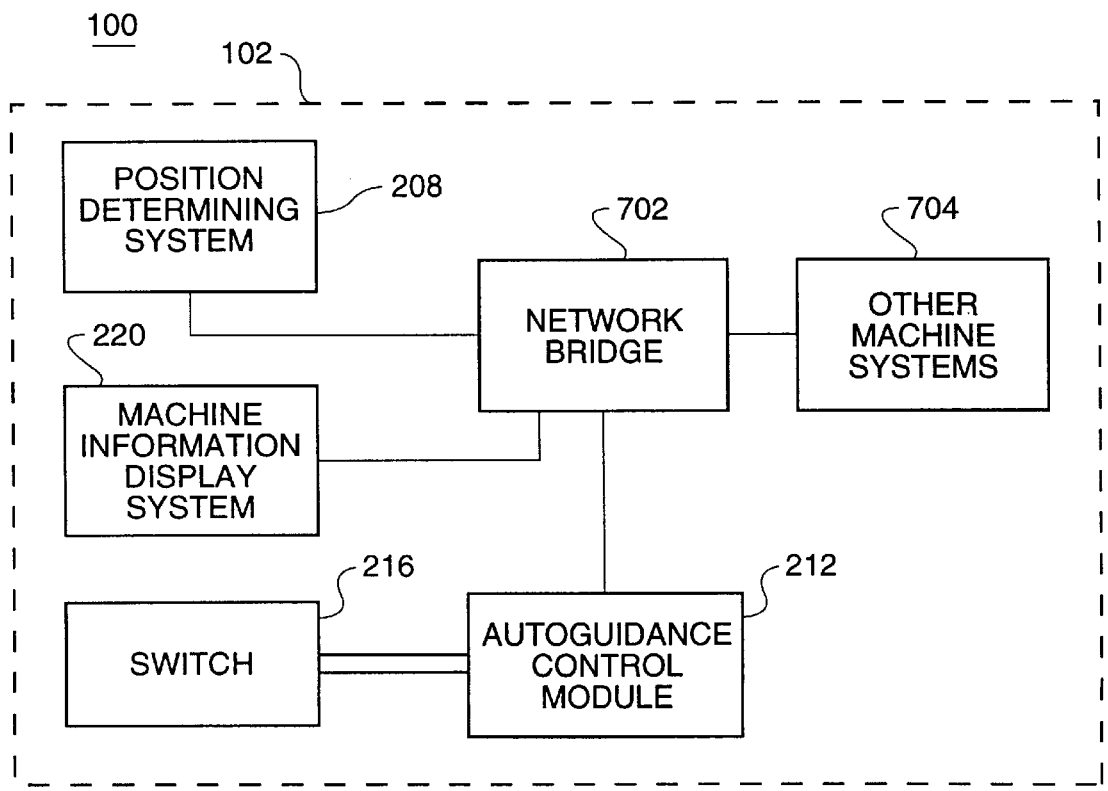

AUTOGUIDANCE SYSTEM AND METHOD FOR AN AGRICULTURAL MACHINE

TECHNICAL FIELD

This invention relates generally to a system and method for providing autoguidance for an agricultural machine and, more particularly, to a system and method for providing autoguidance for an agricultural machine along parallel swaths in a field.

BACKGROUND ART

Agricultural work often involves long, tedious hours in the fields, driving agricultural machines over all portions of each field to perform various tasks, such as seeding, fertilizing, harvesting, tilling, and the like. In addition, the paths to travel in the field must be carefully followed to cover the entire field efficiently and to avoid damage to the crop that is growing. Such work is highly fatiguing, and chance of error increases dramatically over time.

The advent of modern technologies, such as GPS positioning systems, visual guidance systems, and machine control systems, have opened the door to automating many functions that formerly were required to be performed by the repetitious manual operations of individual workers.

One such function involves the guidance control of mobile machines, such as agricultural machines for use in the fields. However, the tolerances required to guide an agricultural machine along rows of crops for extended periods of time create problems which make practical use of the above technologies difficult, if not impossible. For example, an agricultural machine in a field must traverse difficult terrain and yet maintain tolerances within centimeters to avoid damage to crops.

The addition of visual guidance systems, such as light bar guidance systems, offers some assistance in guiding an agricultural machine along these close tolerances. However, light bar guidance systems must be monitored closely, and maintaining this monitoring over long periods of time is difficult and tiring.

The present invention is directed to overcoming one or more of the problems as set forth above.

DISCLOSURE OF THE INVENTION

In one aspect of the present invention a system for providing autoguidance for an agricultural machine is disclosed. The system includes a main machine control module to control steering of the agricultural machine, a position determining system, and a guidance map. The system also includes an autoguidance control module to receive a position signal from the position determining system and data from the guidance map, and responsively determine a current position and a desired path to traverse by the agricultural machine, wherein the desired path to traverse is determined with respect to rows of crop in a field, and wherein the main machine control module is adapted to receive a control signal from the autoguidance control module and control steering of the agricultural machine in response to activation of the autoguidance control module control signal.

In another aspect of the present invention a method for providing autoguidance for an agricultural machine is disclosed. The method includes the steps of determining a position and a heading of the agricultural machine, compensating the position determination with a roll compensation factor, and determining the location of a plurality of desired paths. The method also includes the steps of enabling autoguidance of the agricultural machine in response to activation of an autoguidance control module, and controlling steering of the agricultural machine with respect to the desired paths.

BRIEF DESCRIPTION OF THE DRAWINGS

FIG. 6 is a diagrammatic illustration of another aspect of the present invention; and FIG. 7 is a block diagram illustrating another aspect of the present invention.

BEST MODE FOR CARRYING OUT THE INVENTION

Figure 1:
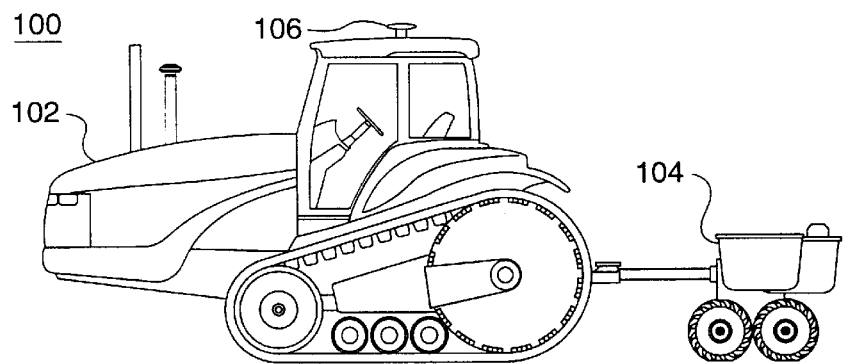
FIG. 1 is a diagrammatic illustration of an agricultural machine suited for use with the present invention.
Figure 2:
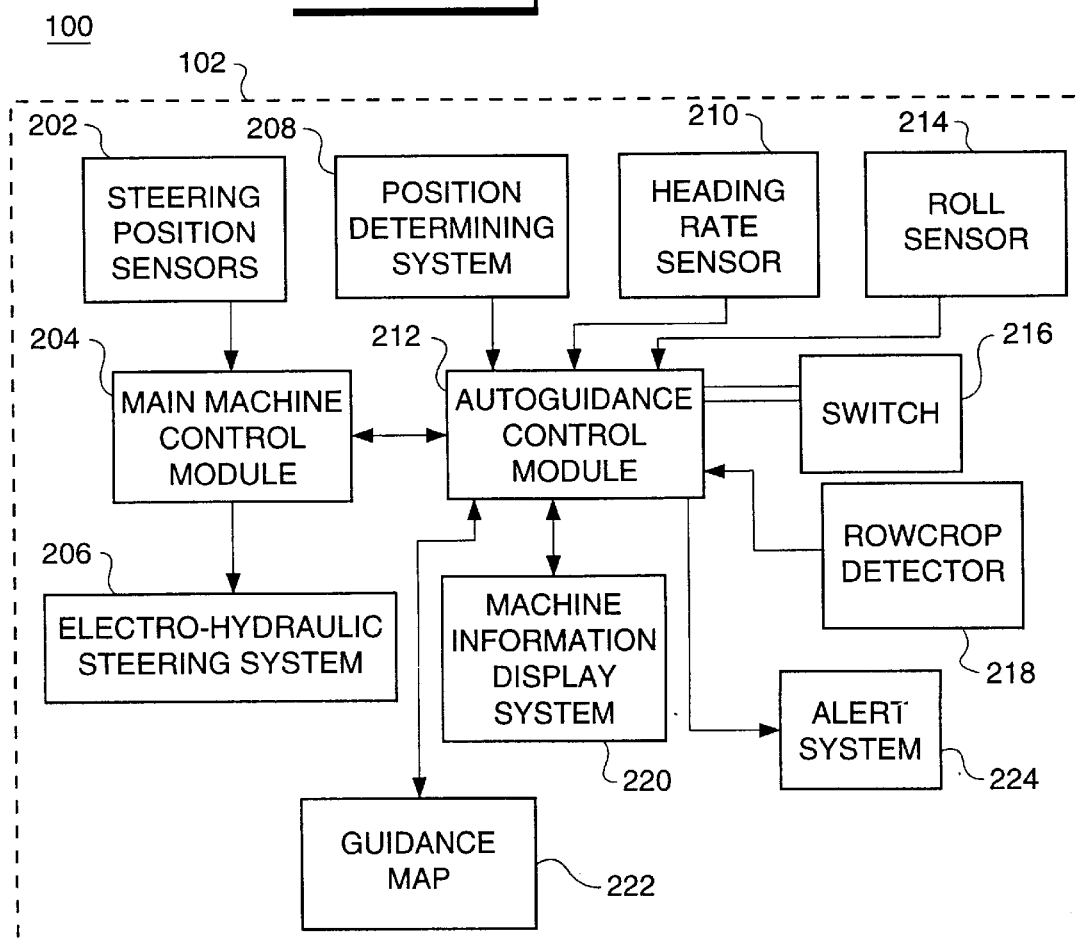
FIG. 2 is a block diagram illustrating a preferred embodiment of the present invention.

Referring to the drawings, and with particular reference to FIGS. 1 and 2, a system 100 for providing autoguidance for an agricultural machine 102 is shown. The agricultural machine 102 depicted in FIG. 1 is a tractor. However, other types of agricultural machines, e.g., combines, chemical applicators, and the like, could also be used with the present invention. In addition, the agricultural machine 102 shown in FIG. 1 is a tracked tractor, i.e., the agricultural machine 102 is driven by tracks rather than wheels. However, the present invention is suited for use with many types of agricultural machines, driven by tracks, wheels, or other means.

A work implement 104 is shown attached to the agricultural machine 102 in FIG. 1. Various types of work implements, e.g., seeders, fertilizer spreaders, tillers, discs, plows, and the like, could be attached to the agricultural machine 102 to perform some work function. In addition, the work implement 104 may be attached to the front of the agricultural machine 102, such as the cutter bars on a harvester, rather than at the rear of the agricultural machine 102, as shown in FIG. 1.

Regardless of the type of work implement 104 attached, the effective width, known as the swath, of the work implement is known. The use of the known swath of the work implement 104 is discussed in more detail below in relation to planning paths for the agricultural machine 102 to traverse.

With particular reference to FIG. 2, a block diagram illustrating a preferred embodiment of the present invention is shown. A main machine control module 204 controls various functions of the agricultural machine 102 including, but not limited to, steering control. In the preferred embodiment, the main machine control module 204 controls an electro-hydraulic steering system 206 to steer the agricultural machine 102 in the desired manner. Feedback from steering position sensors 202 allows the main machine control module 204 to monitor steering control to ensure that steering of the agricultural machine 102 is performed as desired. Electro-hydraulic steering systems and steering position sensors are well known in the art, and will not be discussed further.

Preferably, during operator control, steering is controlled by use of a steering wheel, or some such similar device. The steering wheel is normally connected to a set of resolvers, which convert the position of the steering wheel to electrical signals, which are delivered to the main machine control module 204.

A position determining system 208, located on the agricultural machine 102, is adapted to determine the position of the agricultural machine 102. Preferably, the position determining system 208 includes a GPS position determining system. However, other types of position determining systems, e.g., laser reference systems, dead reckoning systems, and the like, may be used as well. In addition, the position determining system 208 may include a combination of position determining technologies. A GPS antenna 106 is shown mounted to the agricultural machine 102 in FIG. 1.

A guidance map 222, located on the agricultural machine 102, is adapted to store and provide information relative to characteristics of the terrain of agricultural fields. For example, position related information, such as boundaries, obstacles, slopes, and the like, could be stored. In addition, the guidance map 222 may also store and provide information related to desired paths for the agricultural machine 102 to traverse.

An autoguidance control module 212, located on the agricultural machine 102, receives position signals from the position determining system 208, and receives data from the guidance map 222, and responsively determines the current position and heading of the agricultural machine 102, and determines a desired path for the agricultural machine 102 to traverse. The autoguidance control module 212 then delivers a control signal to the main machine control module 204, and controls steering of the agricultural machine 102 in response to activation of the control signal delivered from the autoguidance control module 212.

In the preferred embodiment, the desired path for the agricultural machine 102 to traverse is determined with respect to the swath of the work implement 104 being used in the field. Path determination by this means offers the advantage of covering a maximum width of the field during each pass, thus making operations more efficient. Another advantage is that, typically, the rows of crop in the field are determined with respect to the swath and the spacing of the component parts of the work implement 104. This criteria for path selection minimizes rowcrop disturbance while traversing the field.

Preferably, a technique called parallel swathing is used to determine the locations of the desired paths. In summary, parallel swathing determines a series of parallel paths separated by a desired width, i.e., the swath of the work implement 104, from a determined first reference path. The reference path is normally determined by manually traversing a first path and storing the start and end points of the path in the guidance map 222. However, the reference path may alternatively be determined by referring to a boundary from the guidance map 222. The guidance map 222 also serves the function of limiting the determination of parallel swaths due to geographic limitations. The parallel swaths may be straight paths or curved, as needed.

Figure 3:
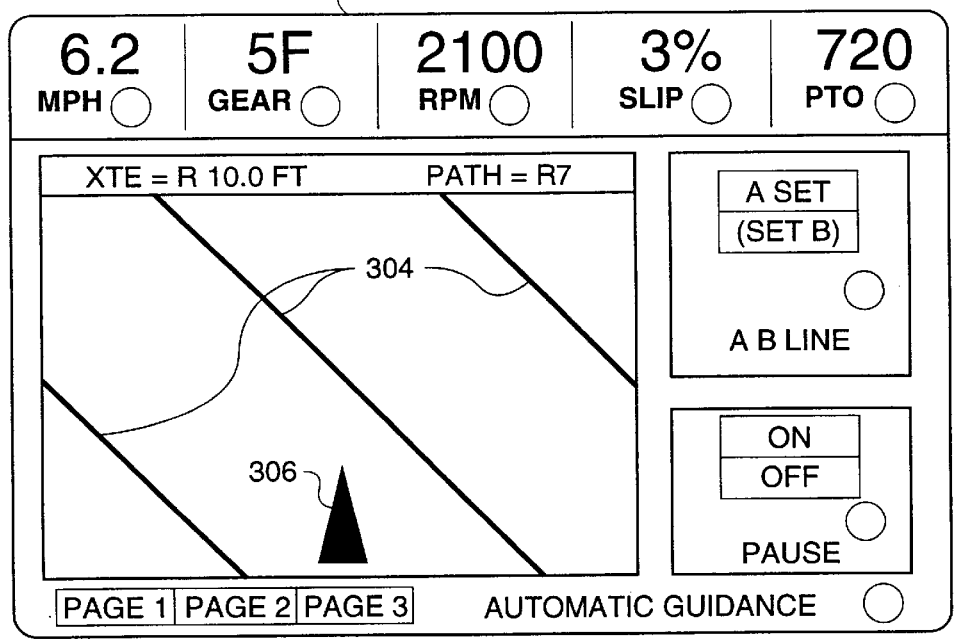
FIG. 3 is a diagrammatic illustration of a display as embodied for use with the present invention.

A machine information display system 220, located on the agricultural machine 102, receives information from the autoguidance control module 212 and responsively displays for an operator the position and heading of the agricultural machine 102 with respect to the rows of crop in the field or, alternatively, to the desired paths to traverse. In addition, as shown in FIG. 3, the machine information display system 220 may display other types of information, such as the status of the autoguidance control module 212, the speed of the agricultural machine 102, the transmission gear being used, and the like. The machine information display system 220 may also be configured to display alternate screens of information containing diagnostics, productivity data, and any other information that may be of interest to an operator. Preferably, the display system 220 is configured to assist an operator with aligning the agricultural machine 102 with the desired path to traverse prior to activating the autoguidance control module 212.

A switch 216, located on the agricultural machine 102, preferably at a location convenient for an operator, is used to activate and deactivate the autoguidance control module 212. In the preferred embodiment, the switch 216 is a momentary contact on/off switch designed to withstand the harsh environments associated with agricultural work.

A heading rate sensor 210, located on the agricultural machine 102, determines the rate of change of heading as the agricultural machine 102 traverses the field. The heading rate information is delivered to the autoguidance control module 212 to enable steering to be performed in a stable manner.

In the preferred embodiment, a roll sensor 214, located on the agricultural machine 102, senses roll, i.e., angular pitch or tilt, of the agricultural machine 102. The amount of roll detected, in degrees from vertical, is delivered to the autoguidance control module 212. The autoguidance control module 212 then compensates for position determination error due to the roll, as is explained in more detail below.

Figure 4:
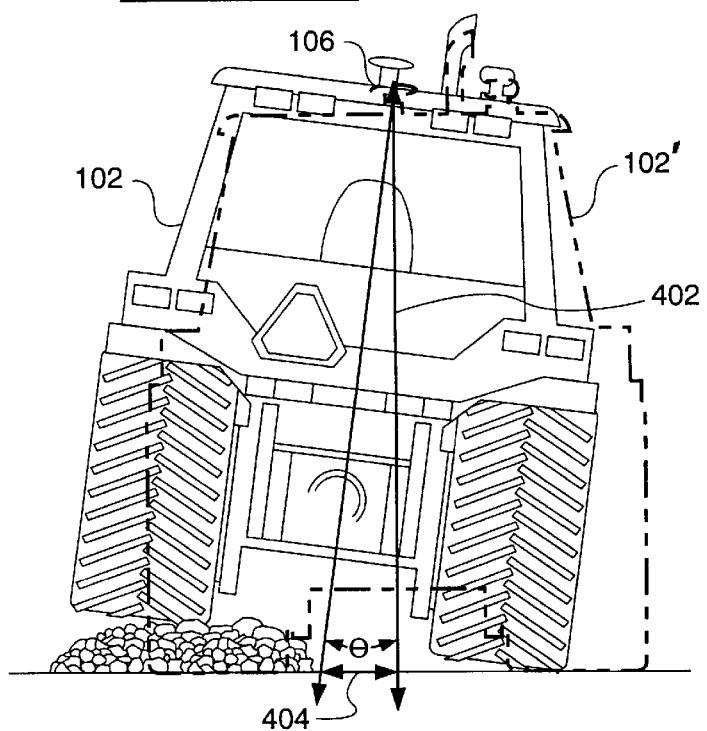
FIG. 4 is a diagrammatic illustration depicting an aspect of roll compensation.

Referring to FIG. 4, an example of the error in position determination caused by roll is shown. The agricultural machine 102 is shown moving over a raised area in the field, such as a rock or bump. One side of the agricultural machine 102 is raised, while the other side is not, thus resulting in a roll by an angle $\Theta$. The GPS antenna 106, mounted on the top of the agricultural machine 102, determines a position with respect to a vertical line 402 from the GPS antenna 106 to the ground. The erroneous position determination results in determining that the agricultural machine 102 is shifted from the actual position, as depicted by the phantom view 102' of the agricultural machine 102.

As an example of an amount of error that can be introduced, assume that the height of the GPS antenna 106 from level ground is three meters. Assume also that the roll $\Theta$ is 10 degrees. Under these conditions, the lateral error 404 would be approximately 52 cm. In addition, an elevation error of approximately 4.5 cm would also be introduced. Error of this magnitude would mislead the autoguidance control module 212 as steering of the agricultural machine 102 was controlled, thus causing the agricultural machine 102 to move off the desired path and potentially damage rowcrops.

The example of FIG. 4 was in reference to one side of the agricultural machine 102 moving over a raised area. However, roll of significant magnitude can also exist when traversing a slope, moving with one side in a depression, and the like.

Although the location of rowcrop may be stored in the guidance map 222 for retrieval as needed, an optional rowcrop detector 218, located on the agricultural machine 102, may be used to assist in determining the precise locations of rowcrop as the crop grows. In one embodiment, the rowcrop detector 218 includes at least one sensor adapted to sense the presence of crop in response to making contact, i.e., touching, the crop. However, other types of rowcrop detectors, e.g., ultrasonic, radar, laser, and the like, may also be used.

An alert system 224, located on the agricultural machine 102, is adapted to notify an operator in response to the autoguidance control module 212 determining that a condition requiring operator intervention exists. Examples of conditions requiring operator intervention include, but are not limited to, approaching an end of row, detecting an obstacle, and detecting a condition requiring service or maintenance.

The alert system 224 may be visual, audible, or a combination of both.

In one embodiment of the present invention, the autoguidance system 100 is located on the agricultural machine 102 as a stand-alone system. In this embodiment, the system 100 is interfaced only to those portions of the agricultural machine 102 needed to enable autoguidance of the agricultural machine 102. However, due to the increasing use of other complex systems, such as precision farming systems and machine diagnostics systems, it is sometimes desirable to integrate the various systems to take advantage of the data flow which overlaps the systems. The increase in the amount and complexity of the data being routed throughout the agricultural machine may require some means of controlling the flow of data.

For example, data flow in a complex system may take place in a data bus environment. A modern agricultural machine 102 may have several data buses. Examples may include, but are not limited to, a control bus to control operations of the agricultural machine 102, a diagnostics and machine information bus, a precision farming data bus, and an autoguidance data bus. It would be desirable to allow data to flow between these multiple data buses, as well as within each bus. However, interconnecting the buses could create data flow problems, as well as combine proprietary data with other types of routine data on the agricultural machine 102.

The autoguidance system 100 of the present invention, therefore, may include a network bridge 702, as shown in FIG. 7. The network bridge 702 provides a controlled path for data flow between various systems located on the agricultural machine 102, including, but not limited to, the autoguidance control module 212, the position determining system 208, the machine information display system 220, and other machine systems 704 adapted to perform various functions. Preferably, the network bridge 702 is capable of determining the types and amount of data which should be allowed to flow from source to destination among the data buses.

Figure 5:
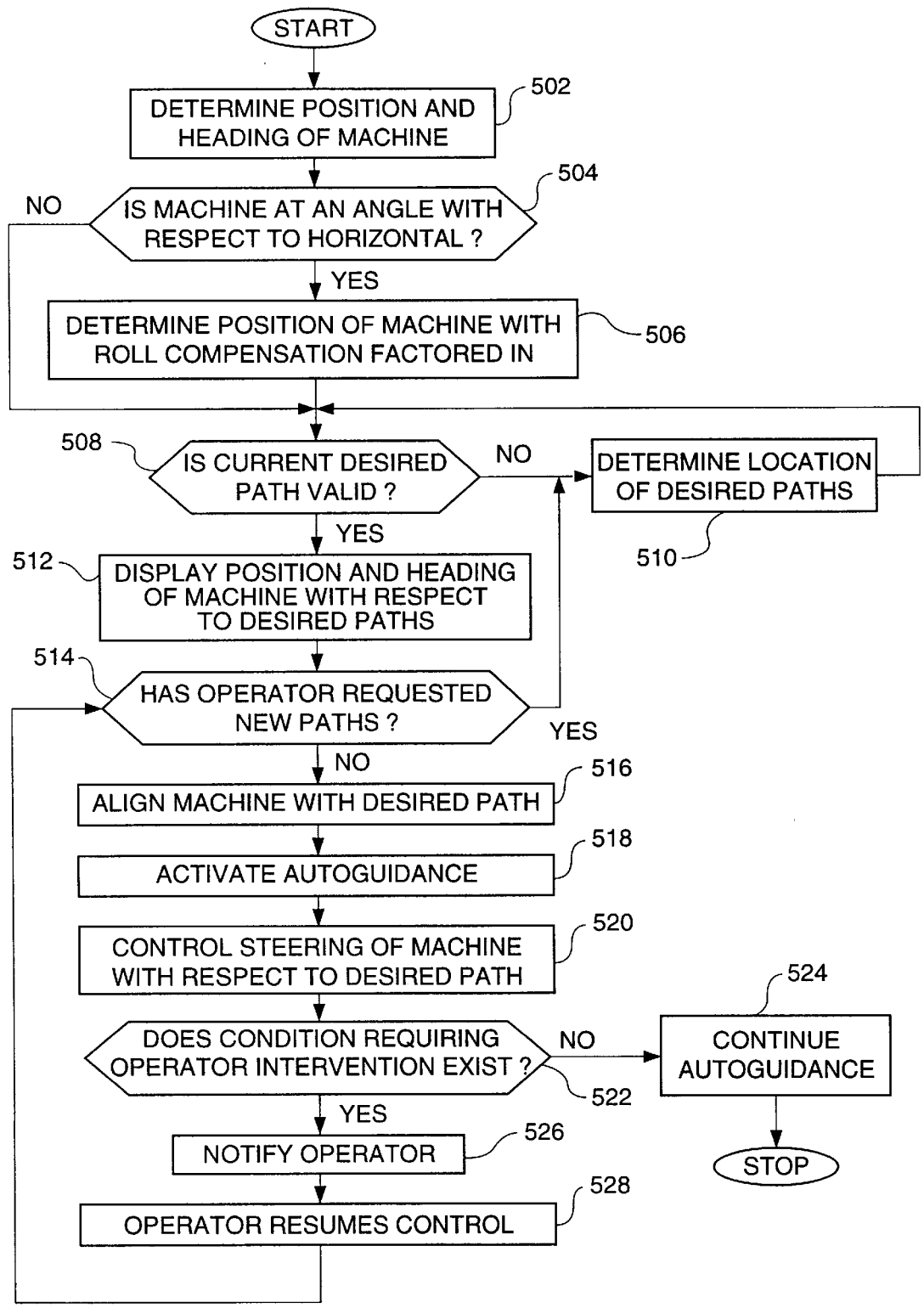
FIG. 5 is a flow diagram illustrating a preferred method of the present invention.

Referring now to FIG. 5, a flow diagram illustrating a preferred method of the present invention is shown.

In a first control block 502, the position and heading of the agricultural machine 102 is determined, preferably by the position determining system 208. In a first decision block 504, a determination is made whether the agricultural machine 102 is at an angle, i.e., whether roll of the agricultural machine 102 has occurred. If it is determined that no roll has occurred, control proceeds to a second decision block 508. However, if it is determined that roll has occurred, control proceeds to a second control block 506. In the second control block 506, the position of the agricultural machine 102 is determined again, this time with roll compensation factored in, as discussed above with reference to FIG. 4.

In the second decision block 508, it is determined if the current desired path is valid. For example, the locations of the desired paths may have been determined prior to this step. If the locations of the desired paths have previously been determined, and the desired paths are still valid, then control proceeds to a fourth control block 512. However, if it is determined that the current desired path is not valid, control proceeds to a third control block 510.

In the third control block 510, the locations of the desired paths are determined. In one embodiment, the locations of the desired paths are determined by determining a first reference path and responsively determining a plurality of parallel paths as a function of the swath of the work implement 104 being used. However, these determined paths may then be stored in the guidance map 222 and, in another aspect of the present invention, the locations of the desired paths may be determined by recalling these previously determined desired paths from the guidance map 222. For example, if the work implement 104 to be used has the same swath as a previously used work implement 104, the desired paths may be determined as the same paths used previously.

In yet another embodiment, a remote site 602, as depicted in FIG. 6, provides the desired paths to the agricultural machine 102. The remote site 602 may be a base station office, or another agricultural machine 102. The desired paths may be predetermined and stored for use as needed, or, alternatively, the desired paths may be determined on request. The desired paths may be provided to the agricultural machine 102 by way of wireless communications, wired link, e.g., the agricultural machine 102 may travel to the remote site 602 and be connected to the remote site 602 by a wired link for transfer of information, or by any other suitable means such as manual transfer by way of diskette and such.

In the fourth control block 512, the position and heading of the agricultural machine 102 with respect to the desired paths is displayed to an operator.

In a third decision block 514, it is determined if the operator has requested a new desired path. For example, the agricultural machine may have reached the end of a row, and the operator may desire to position the agricultural machine in a new row in which a desired path has not been determined. As another example, the operator may not want to traverse the determined desired paths, and prefers to let the system determine the location of a new set of desired paths. If the operator does request a new path, control proceeds back to the third control block 510, where the location of new desired paths are determined as discussed above.

If it is determined that the operator has not requested a new path, control then proceeds to a fifth control block 516. In the fifth control block 516, the operator aligns the agricultural machine 102 to a desired position and heading relative to the start of the desired path. This step places the agricultural machine 102 in a position suitable to begin autoguidance. Control then proceeds to a sixth control block 518, where autoguidance is activated, preferably by depressing the switch 216. Once autoguidance is activated, the steering of the agricultural machine 102 is controlled with respect to the desired path, as shown in a seventh control block 520.

In a fourth decision block 522, it is determined if a condition requiring operator intervention exists. For example, the agricultural machine 102 may be approaching the end of a desired path, or a fault parameter may have been detected. If no condition requiring operator intervention is found to exist, control proceeds to an eighth control block 524, where autoguidance is continued. However, if a condition requiring operator intervention is determined to exist, control proceeds to a ninth control block 526, where the operator is notified by means of the alert system 224. Optionally, the autoguidance control module 212 may be programmed to shut down the agricultural machine 102 in the event the operator does not respond to the notification within a predetermined amount of time.

The operator, in response to notification that a condition requiring operator intervention exists, may then, in a tenth control block 528, resume control of the agricultural machine 102, e.g., by depressing the switch 216. Alternatively, the system may return control to an operator at any time in response to sensing that the operator has taken control, e.g., by the operator moving the steering wheel, clutch, or brake.

Industrial Applicability

As an example of the present invention in operation, an agricultural machine 102, such as a tractor or a harvester, is used to pull or carry a work implement 104 throughout a field with great care to cover the entire field efficiently and to protect any rowcrop from damage. Much of the field is traversed in long, relatively straight passes which are parallel to each other. The present invention is configured to determine the desired paths to traverse, and responsively control the steering operations required to accurately follow the paths. The autoguidance feature of the present invention reduces fatigue of an operator and improves efficient operations by optimizing the coverage of the field by the agricultural machine 102.

Other aspects, objects, and features of the present invention can be obtained from a study of the drawings, the disclosure, and the appended claims.

What is claimed is:

1. A system for providing autoguidance for an agricultural machine having a work implement attached, comprising:
    a main machine control module located on the agricultural machine and adapted to control steering of the agricultural machine;
    a position determining system located on the agricultural machine;
    a guidance map located on the agricultural machine;
    an autoguidance control module located on the agricultural machine and adapted to receive a position signal from the position determining system and data from the guidance map, and responsively determine a current position and a desired path to traverse by the agricultural machine, wherein the desired path to traverse is determined with respect to rows of crop in a field, and wherein the main machine control module is adapted to receive a control signal from the autoguidance control module and control steering of the agricultural machine in response to activation of the autoguidance control module control signal; and
    a network bridge located on the agricultural machine and adapted to provide a controlled path for data to flow between the main machine control module, the position determining system, and the autoguidance control module.

2. A system, as set forth in claim 1, further including a machine information display system located on the agricultural machine, wherein the autoguidance control module is further adapted to deliver display data to the machine information display system.

3. A system, as set forth in claim 2, wherein the display data enables the machine information display system to display the position and heading of the agricultural machine with respect to the rows of crop in the field.

4. A system, as set forth in claim 1, wherein the autoguidance control module is activated by an operator controlled switch.

5. A system, as set forth in claim 1, further including a heading rate sensor located on the agricultural machine.

6. A system, as set forth in claim 1, further including a roll sensor located on the agricultural machine.

7. A system, as set forth in claim 6, wherein the autoguidance control module is further adapted to receive data from the roll sensor and responsively compensate for errors in the position determinations caused by roll of the agricultural machine.

8. A system, as set forth in claim 1, further including a rowcrop detector located on the agricultural machine.

9. A system, as set forth in claim 8, wherein the rowcrop detector is adapted to detect the position of rows of crop with respect to the position of the agricultural machine.

10. A system, as set forth in claim 9, wherein the rowcrop detector includes at least one sensor adapted to sense the presence of rowcrop in response to making contact with the rowcrop.

11. A system, as set forth in claim 1, further including an alert system located on the agricultural machine and adapted to notify an operator in response to the autoguidance control module determining a condition requiring operator intervention.

12. A system, as set forth in claim 11, wherein the alert system is adapted to provide at least one of a visual and audible notification.

13. A system, as set forth in claim 1, wherein the autoguidance control module is further adapted to determine a plurality of parallel paths for the agricultural machine to traverse.

14. A system, as set forth in claim 13, wherein the parallel paths are determined as a function of the width of the work implement.

15. A system for providing autoguidance for an agricultural machine having a work implement attached, comprising:
    a main machine control module located on the agricultural machine and adapted to control steering of the agricultural machine;
    a position determining system located on the agricultural machine;
    a guidance map located on the agricultural machine;
    an autoguidance control module located on the agricultural machine and adapted to receive a position signal from the position determining system and data from the guidance map, and responsively determine a current position and a desired path to traverse by the agricultural machine, wherein the desired path to traverse is determined with respect to the width of the work implement, and wherein the main machine control module is adapted to receive a control signal from the autoguidance control module and control steering of the agricultural machine in response to activation of the autoguidance control module control signal; and
    a network bridge located on the agricultural machine and adapted to provide a controlled path for data to flow between the main machine control module, the position determining system, and the autoguidance control module.

16. A system, as set forth in claim 15, wherein the determined desired path is determined as one of a plurality of parallel paths, each determined path being determined as a function of the width of the work implement.

17. A system, as set forth in claim 16, wherein the autoguidance control module is further adapted to determine the plurality of parallel paths as a function of a first determined reference path.

18. A system, as set forth in claim 17, wherein the plurality of parallel paths are determined as a function of the first determined reference path being one of a straight and curved path segment.

19. A method for providing autoguidance for an agricultural machine having a work implement attached, including the steps of:
- determining a position and a heading of the agricultural machine;
- compensating the position determination with a roll compensation factor;
- determining the location of a plurality of desired paths;
- enabling autoguidance of the agricultural machine in response to activation of an autoguidance control module; and
- controlling steering of the agricultural machine with respect to the desired paths, wherein steering in a lateral direction is further controlled with respect to the roll compensation factor.

20. A method, as set forth in claim 19, further including the step of displaying to an operator the position and the heading of the agricultural machine with respect to the desired paths.

21. A method, as set forth in claim 19, wherein activation of the autoguidance control module is performed by an operator controlled switch.

22. A method, as set forth in claim 19, further including the step of notifying an operator in response to a condition requiring operator intervention.

23. A method, as set forth in claim 22, wherein notifying an operator is performed by at least one of a visual and an audible notification.

24. A method, as set forth in claim 19, wherein determining the location of a plurality of desired paths includes the step of determining a plurality of parallel paths for the agricultural machine to traverse.

25. A method, as set forth in claim 24, wherein the parallel paths are determined as a function of the width of the work implement.

26. A method, as set forth in claim 19, further including the step of controlling the flow of data on the agricultural machine.

27. A system for providing autoguidance for an agricultural machine having a work implement attached, comprising:
- a main machine control module located on the agricultural machine and adapted to control steering of the agricultural machine;
- a position determining system located on the agricultural machine;
- a guidance map located on the agricultural machine;
- a heading rate sensor located on the agricultural machine;
- a roll sensor located on the agricultural machine; and
- an autoguidance control module located on the agricultural machine and adapted to receive a position signal from the position determining system and data from the guidance map, the heading rate sensor, and the roll sensor, and responsively determine a current position and a desired path to traverse by the agricultural machine, wherein the desired path to traverse is determined with respect to rows of crop in a field, wherein the main machine control module is adapted to receive a control signal from the autoguidance control module and control steering of the agricultural machine in response to activation of the autoguidance control module control signal, and wherein the autoguidance control module is adapted to receive an amount of roll detected by the roll sensor and responsively determine a roll compensation factor to compensate the position determination of the agricultural machine in a lateral direction.

28. A system, as set forth in claim 27, further including a machine information display system located on the agricultural machine, wherein the autoguidance control module is further adapted to deliver display data to the machine information display system.

29. A system, as set forth in claim 28, further including a network bridge located on the agricultural machine and adapted to provide a controlled path for data to flow between the main machine control module, the position determining system, the machine information display system, and the autoguidance control module.

* * * * *